United States Patent
Huang et al.

(10) Patent No.: US 8,386,811 B2
(45) Date of Patent: Feb. 26, 2013

(54) COMPUTER HAVING POWER MANAGEMENT FUNCTION

(75) Inventors: Jiang-Wen Huang, Taipei (TW);
Pai-Ching Huang, Taipei (TW);
Ming-Chih Hsu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 240 days.

(21) Appl. No.: 12/464,883

(22) Filed: May 13, 2009

(65) Prior Publication Data

US 2009/0300378 A1    Dec. 3, 2009

(30) Foreign Application Priority Data

May 30, 2008 (TW) ................. 97120203 A

(51) Int. Cl.
*G06F 1/00* (2006.01)
(52) U.S. Cl. .................................... 713/300
(58) Field of Classification Search ................. 713/300
See application file for complete search history.

(56) References Cited

U.S. PATENT DOCUMENTS 7,103,786 B2    9/2006 Chen et al.
2009/0172236 A1 *  7/2009 Sun ............................... 710/302

FOREIGN PATENT DOCUMENTS

CN    1307259 A    8/2001

* cited by examiner

*Primary Examiner* — Paul R Myers
*Assistant Examiner* — Jeremy S Cerullo
(74) *Attorney, Agent, or Firm* — CKC & Partners Co., Ltd.

(57) ABSTRACT

A power management system is disposed in a computer. The power management system includes a current detecting module and a chipset. The current detecting module is disposed between the power receiving end of an external device and the power cord of the power source of the computer for detecting the current sink by the external device and accordingly outputting a current detecting signal. The chipset adjusts the operating voltage or operating frequency of the external device according to the current detecting signal.

8 Claims, 6 Drawing Sheets

COMPUTER HAVING POWER MANAGEMENT FUNCTION

BACKGROUND OF THE INVENTION

1. Field of the Invention

The present invention relates to a power management system for a computer, and more particularly, to a power management system for a computer adjusting power consumption by detecting current.

2. Description of the Prior Art

Please refer to FIG. 1. FIG. 1 is a diagram illustrating a conventional computer 100. As shown in FIG. 1, the computer 100 comprises a power supply PS and a mother board MB. The mother board comprises a central processing unit CPU, a chipset CS, a DC/DC converter $DC/DC_1$, two regulators $LDO_1$ and $LDO_2$, a predetermined function device $Y_1$, and an internal current detecting module $CDM_1$.

The power supply PS comprises a first output end $O_1$ and a second output end $O_2$ for respectively providing power. The first output end $O_1$ of the power supply PS is coupled to the power socket $SKT_1$ through the power cord $W_1$ and the power plug $CON_1$ for providing power to the DC/DC converter $DC/DC_1$. The DC/DC converter $DC/DC_1$ converts the received power to appropriate voltages and provides the converted voltages to the regulators $LDO_1$ and $LDO_2$ respectively. The regulator $LDO_1$ provides an appropriate voltage to the central processing unit CPU and the chipset CS. The regulator $LDO_2$ provides an appropriate voltage to the predetermined function device $Y_1$.

The internal current detecting module $CDM_1$ is coupled between the regulator $LDO_2$ and the predetermined function device $Y_1$ for detecting the current transmitted from the regulator $LDO_2$ to the predetermined function device $Y_1$, and accordingly outputs a current detecting signal $S_{J1}$ to the chipset CS. The chipset CS determines the operation status of the predetermined function device $Y_1$ according to the current detecting signal $S_{J1}$, and accordingly adjusts the power consumption of the predetermined function device $Y_1$. For example, when the current detecting signal $S_{J1}$ is lower than a predetermined value $I_{P1}$, the chipset CS determines the operation status of the predetermined function device $Y_1$ to be idle; when the current detecting signal $S_{J1}$ is higher than the predetermined value $I_{P1}$, the chipset CS determines the operation status of the predetermined function device $Y_1$ to be busy. When the chipset CS determines the operation status of the predetermined function device $Y_1$ to be idle, the chipset CS transmits a control signal $S_{C1}$ to the regulator $LDO_2$ for decreasing the output voltage of the regulator $LDO_2$ so as to reduce the power consumption of the predetermined function device $Y_1$, or, when the chipset CS determines the operation status of the predetermined function device $Y_1$ to be idle, the chipset CS transmits a control signal $SC_2$ to the predetermined function device $Y_1$ for decreasing the operating frequency of the predetermined function device $Y_1$ so as to reduce the power consumption of the predetermined function device $Y_1$. When the chipset CS determines the operation status of the predetermined function device $Y_1$ to be busy, the chipset CS transmits a control signal $S_{C1}$ to the regulator $LDO_2$ for increasing the output voltage of the regulator $LDO_2$ so as to accelerate the processing speed of the predetermined function device $Y_1$, or, when the chipset CS determines the operation status of the predetermined function device $Y_1$ to be busy, the chipset CS transmits a control signal $S_{C2}$ to the predetermined function device $Y_1$ for increasing the operating frequency of the predetermined function device $Y_1$ so as to accelerate the processing speed of the predetermined function device $Y_1$.

The mother board MB is also equipped with a socket $SKT_X$ coupling to the chipset CS through Peripheral Component Interface (PCI) or the like for allowing users to connect the external devices onto the mother board MB. As shown in FIG. 1, the external device X can be plugged into the socket $SKT_X$ so as to communicate with the chipset CS through the PCI or the like and accordingly execute the function of the external device X.

Generally, under the condition that the power consumption of the external device X is small, the DC/DC converter $DC/DC_1$ of the mother board MB directly provides power to the external device X through the socket $SKT_X$. However, if the power consumption of the external device X (i.e. accelerated graphic card) is too high, the DC/DC converter $DC/DC_1$ of the mother board MB cannot provide enough power to the external device X. Therefore, the external device X has to receive power from the second output end $O_2$ of the power supply PS of the computer 100.

The external device X comprises a power socket $SKT_2$, a DC/DC converter $DC/DC_2$, a regulator $LDO_3$, and a predetermined function device $Y_2$. As stated above, if the external device X is an accelerated graphic card, then the predetermined function device $Y_2$ functions for accelerating the execution of the graphic calculation. The second output end $O_2$ of the power supply PS is coupled to the power socket $SKT_2$ through the power cord $W_2$ and the power plug $CON_2$ for providing power to the DC/DC converter $DC/DC_2$. The DC/DC converter $DC/DC_2$ converts the received power to appropriate voltages and provides the converted voltages to the regulator $LDO_3$. The regulator $LDO_3$ provides an appropriate voltage to the predetermined function device $Y_2$. In this way, the predetermined function device $Y_2$ can communicate with the interface of the chipset CS through the socket $SKT_X$ for executing the predetermined function.

However, since the power consumed by the external device X is provided directly from the power supply PS, the chipset CS cannot be informed with the power consumption and the operation status of the external device X, and consequently cannot accordingly adjust the provided voltage and the operating frequency of the external device X, causing inefficiency of the predetermined device X and power wasting.

SUMMARY OF THE INVENTION

The present invention provides a computer having power management function. The computer comprises a power supply, an external device, and a mother board. The power supply comprises a first output end and a second output end for respectively providing power. The external device is coupled to the second output end of the power supply for receiving power. The mother board is coupled to the first output end of the power supply for receiving power. The mother board comprises an additional current detecting module, coupled between the second output end of the power supply and the external device, for detecting current received by the external device and accordingly outputting a current detecting signal, and a controller, coupled between the additional current detecting module and the external device, for outputting a control signal to the external device according to the current detecting signal so as to control operation status of the external device.

The present invention further provides a computer having power management function. The computer comprises a power supply, an external device, an additional current detecting module, and a mother board. The power supply comprises a first output end and a second output end for respectively providing power. The external device is coupled to the second output end of the power supply for receiving power. The additional current detecting module is coupled between the second output end of the power supply and the external device for detecting current received by the external device and accordingly outputting a current detecting signal. The mother board is coupled to the first output end of the power supply for receiving power. The mother board comprises a controller, coupled between the current detecting module and the external device, for outputting a control signal to the external device according to the current detecting signal so as to control operation status of the external device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
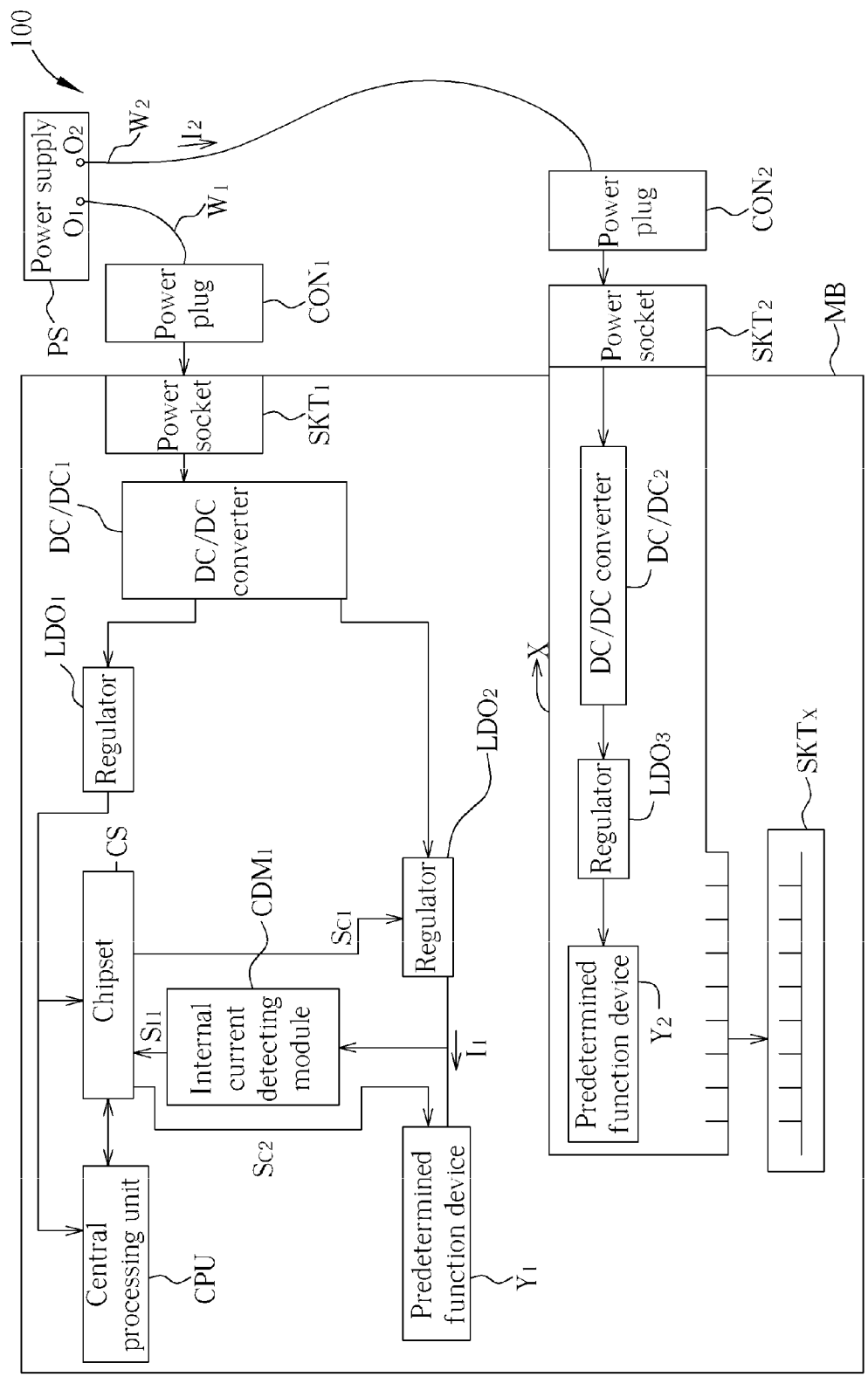
FIG. 1 is a diagram illustrating a conventional computer.
Figure 2:
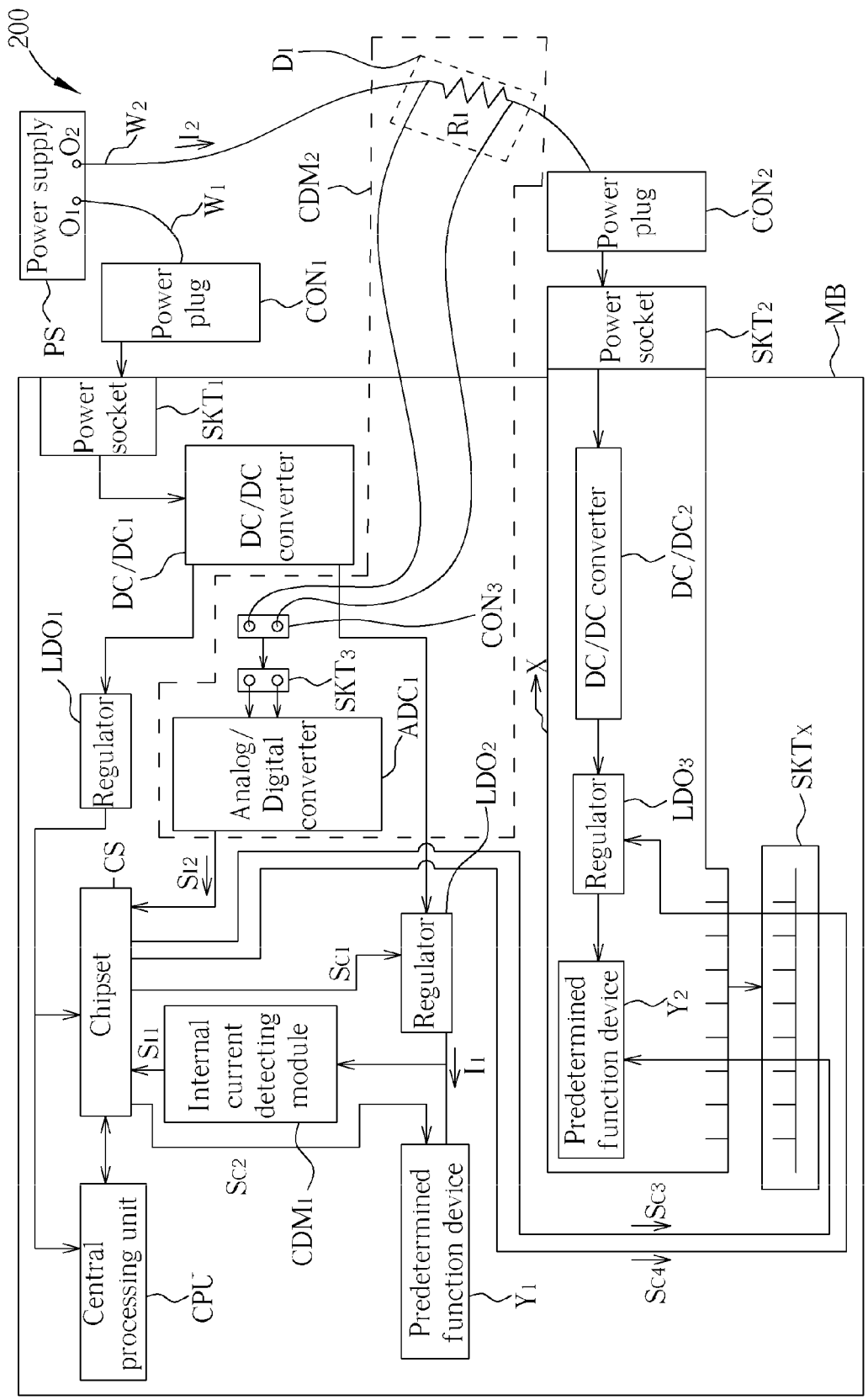
FIG. 2 is a diagram illustrating a computer utilizing a power management system according to a first embodiment of the present invention.

Please refer to FIG. 2. FIG. 2 is a diagram illustrating a computer 200 utilizing a power management system according to a first embodiment of the present invention. As shown in FIG. 2, the computer 200 comprises a power supply PS and a mother board MB. The mother board MB comprises a central processing unit CPU, a chipset CS, two regulators $LDO_1$ and $LDO_2$, a predetermined function device $Y_1$, and an internal current detecting module $CDM_1$, and an additional current detecting module $CDM_2$. The power management system 210 (not shown) comprises the chipset CS and the additional current detecting module $CDM_2$.

The power supply PS comprises a first output end $O_1$ and a second output end $O_2$ for respectively providing power. The first output end $O_1$ of the power supply PS is coupled to the power socket $SKT_1$ through the power cord $W_1$ and the power plug $CON_1$ for providing power to the DC/DC converter $DC/DC_1$. The DC/DC converter $DC/DC_1$ converts the received power to appropriate voltages and provides the converted voltages to the regulators $LDO_1$ and $LDO_2$ respectively. The regulator $LDO_1$ provides an appropriate voltage to the central processing unit CPU and the chipset CS. The regulator $LDO_2$ provides an appropriate voltage to the predetermined function device $Y_1$.

The internal current detecting module $CDM_1$ is coupled between the regulator $LDO_2$ and the predetermined function device $Y_1$ for detecting the current transmitted from the regulator $LDO_2$ to the predetermined function device $Y_1$, and accordingly outputs a current detecting signal $S_{f1}$ to the chipset CS. The chipset CS determines the operation status of the predetermined function device $Y_1$ according to the current detecting signal $S_{f1}$, and accordingly adjusts the power consumption of the predetermined function device $Y_1$. For example, when the current detecting signal $S_{f1}$ is lower than a predetermined value $I_{P1}$, the chipset CS determines the operation status of the predetermined function device $Y_1$ to be idle; when the current detecting signal $S_{f1}$ is higher than the predetermined value $I_{P1}$, the chipset CS determines the operation status of the predetermined function device $Y_1$ to be busy. When the chipset CS determines the operation status of the predetermined function device $Y_1$ to be idle, the chipset CS transmits a control signal $S_{C1}$ to the regulator $LDO_2$ for decreasing the output voltage of the regulator $LDO_2$ so as to reduce the power consumption of the predetermined function device $Y_1$, or, when the chipset CS determines the operation status of the predetermined function device $Y_1$ to be idle, the chipset CS transmits a control signal $S_{C2}$ to the predetermined function device $Y_1$ for decreasing the operating frequency of the predetermined function device $Y_1$ so as to reduce the power consumption of the predetermined function device $Y_1$. When the chipset CS determines the operation status of the predetermined function device $Y_1$ to be busy, the chipset CS transmits a control signal $S_{C1}$ to the regulator $LDO_2$ for increasing the output voltage of the regulator $LDO_2$ so as to accelerate the processing speed of the predetermined function device $Y_1$, or, when the chipset CS determines the operation status of the predetermined function device $Y_1$ to be busy, the chipset CS transmits a control signal $S_{C2}$ to the predetermined function device $Y_1$ for increasing the operating frequency of the predetermined function device $Y_1$ so as to accelerate the processing speed of the predetermined function device $Y_1$.

The mother board MB is also equipped with a socket $SKT_X$ coupling to the chipset CS through Peripheral Component Interface (PCI) or the like for allowing users to connect the external devices onto the mother board MB. As shown in FIG. 2, the external device X can be plugged into the socket $SKT_X$ so as to communicate with the chipset CS through the PCI or the like and accordingly execute the function of the external device X.

Generally, under the condition that the power consumption of the external device X is small, the DC/DC converter $DC/DC_1$ of the mother board MB directly provides power to the external device X through the socket $SKT_X$. However, if the power consumption of the external device X (i.e. accelerated graphic card) is too high, the DC/DC converter $DC/DC_1$ of the mother board MB cannot provide enough power to the external device X. Therefore, the external device X has to receive power from the second output end $O_2$ of the power supply PS of the computer 200.

The external device X comprises a power socket $SKT_2$, a DC/DC converter $DC/DC_2$, a regulator $LDO_3$, and a predetermined function device $Y_2$. As stated above, if the external device X is an accelerated graphic card, then the predetermined function device $Y_2$ functions for accelerating the execution of the graphic calculation. The second output end $O_2$ of the power supply PS is coupled to the power socket $SKT_2$ through the power cord $W_2$ and the power plug $CON_2$ for providing power to the DC/DC converter $DC/DC_2$. The DC/DC converter $DC/DC_2$ converts the received power to appropriate voltages and provides the converted voltages to the regulator $LDO_3$. The regulator $LDO_3$ provides an appropriate voltage to the predetermined function device $Y_2$. In this way, the predetermined function device $Y_2$ can communicate with the interface of the chipset CS through the socket $SKT_X$ for executing the predetermined function.

The power management system 210 detects the current consumed by the external device X and accordingly control the operation status of the external device X. In the power management system 210, the additional current detecting module $CDM_2$ comprises an analog/digital converter $ADC_1$, a socket $SKT_3$, a plug $CON_3$, and a current detector $D_1$, wherein the analog/digital converter $ADC_1$, the socket $SKT_3$, and the plug $CON_3$ can be disposed on the mother board MB. The current detector $D_1$ of the additional current detecting module $CDM_2$ is disposed at the power cord $W_2$ coupled to the second output end $O_2$ of the power supply PS for detecting current passing through the power cord $W_2$ of the power supply PS and accordingly outputting an analog current detecting signal. The analog current detecting signal is transmitted to the analog/digital converter $ADC_1$ through the plug $CON_3$ and the socket $SKT_3$ and is converted to a digital signal as the current detecting signal $S_{I2}$. The current detecting signal $S_{I2}$ is transmitted to the chipset CS. In this way, the chipset CS determines the operation status of the predetermined function device $Y_2$ according to the current detecting signal $S_{I2}$ and accordingly adjusts the power consumption of the predetermined function device $Y_2$. For example, when the current detecting signal $S_{I2}$ is lower than a predetermined value $I_{P2}$, the chipset CS determines the operation status of the predetermined function device $Y_2$ to be idle; when the current detecting signal $S_{I2}$ is higher than the predetermined value $I_{P2}$, the chipset CS determines the operation status of the predetermined function device $Y_2$ to be busy. When the chipset CS determines the operation status of the predetermined function device $Y_2$ to be idle, the chipset CS transmits a control signal $S_{C4}$ to the regulator $LDO_3$ for decreasing the output voltage of the regulator $LDO_3$ so as to reduce the power consumption of the predetermined function device $Y_2$, or, when the chipset CS determines the operation status of the predetermined function device $Y_2$ to be idle, the chipset CS transmits a control signal $S_{C3}$ to the predetermined function device $Y_2$ for decreasing the operating frequency of the predetermined function device $Y_2$ so as to reduce the power consumption of the predetermined function device $Y_2$. When the chipset CS determines the operation status of the predetermined function device $Y_2$ to be busy, the chipset CS transmits a control signal $S_{C4}$ to the regulator $LDO_3$ for increasing the output voltage of the regulator $LDO_3$ so as to accelerate the processing speed of the predetermined function device $Y_2$, or, when the chipset CS determines the operation status of the predetermined function device $Y_2$ to be busy, the chipset CS transmits a control signal $S_{C3}$ to the predetermined function device $Y_2$ for increasing the operating frequency of the predetermined function device $Y_2$ so as to accelerate the processing speed of the predetermined function device $Y_2$.

Additionally, in FIG. 2, the current detector $D_1$ can be realized with a resistor $R_1$. The resistor $R_1$ and the power cord $W_2$ can be connected in series. In this way, the current passing through the power cord $W_2$ can be determined according to the voltage drop on the resistor $R_1$. Therefore, after the conversion of the analog/digital converter $ADC_1$, the current detecting signal $S_{I2}$ is transmitted to the chipset CS. Furthermore, the predetermined values $I_{P1}$ and $I_{P2}$ can be set as desired.

Therefore, the computer 200 not only detects the power consumption of the devices on the mother board but also detects the power consumption of the external device X by utilizing the power management system 210 of the present invention. In this way, the total power consumption of the computer 200 can be accurately calculated and the operation statuses of the internal devices of the computer 200 and the external device X can be controlled efficiently.

Figure 3:
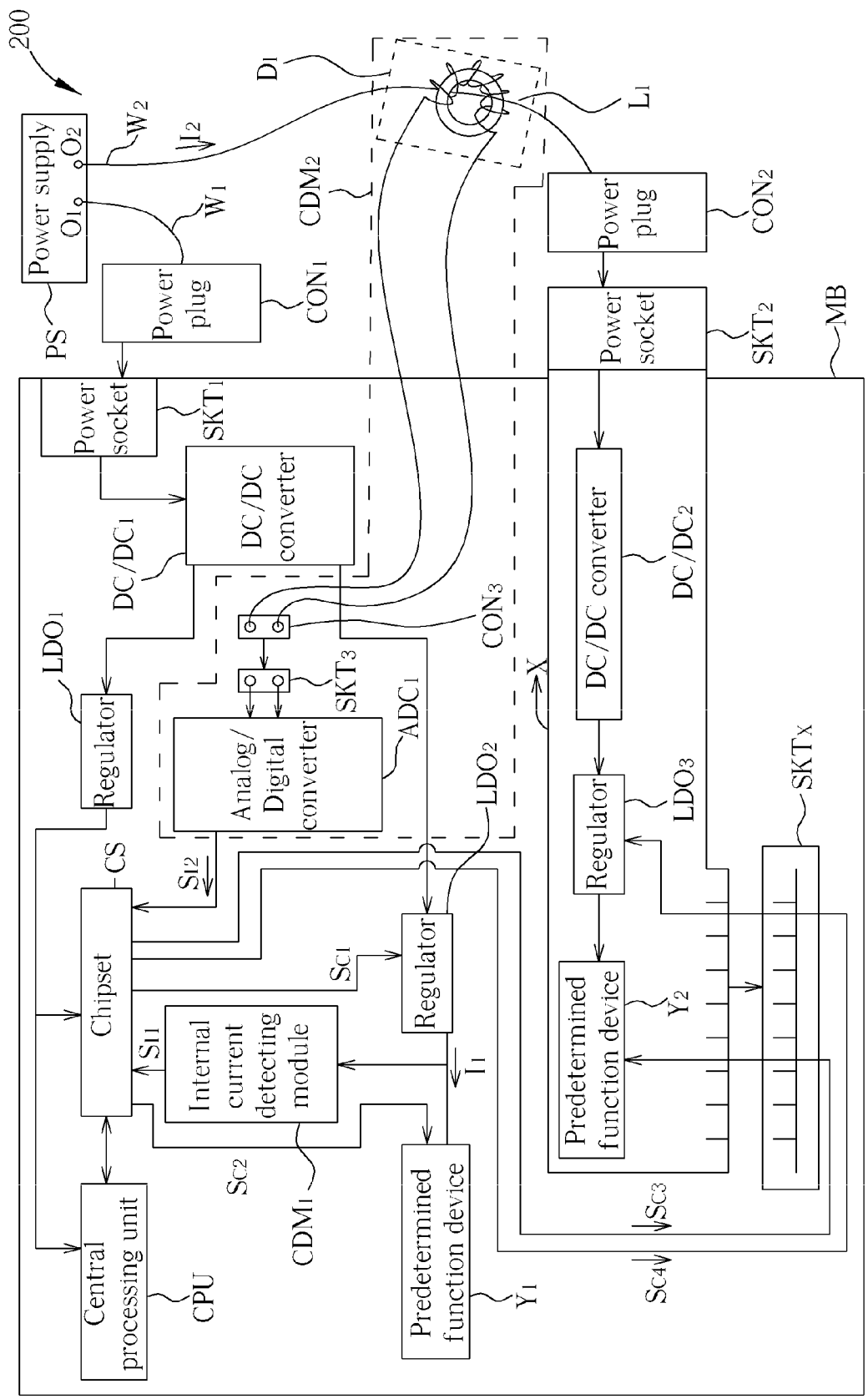
FIG. 3 is a computer utilizing a power management system according to a second embodiment of the present invention.

Please refer to FIG. 3. FIG. 3 is a computer 200 utilizing a power management system according to a second embodiment of the present invention. As shown in FIG. 3, the computer 200 comprises a power supply PS and a mother board MB. The mother board MB comprises a central processing unit CPU, a chipset CS, two regulators $LDO_1$, and $LDO_2$, a predetermined function device $Y_1$, and an internal current detecting module $CDM_1$ and an additional current detecting module $CDM_2$. The power management system 310 (not shown) comprises the chipset CS and the additional current detecting module $CDM_2$. The power management system 310 is similar to the power management system 210 and the related description is omitted. The difference between the power management systems 310 and 210 is that, in the additional current detecting module $CDM_2$ of the power management system 310, the current detector $D_1$ is realized with an inductor $L_1$. The inductor $L_1$ can be a ring-shaped inductor surrounding the power cord $W_2$. The inductor $L_1$ generates induced current according to the current passing through the power cord $W_2$, and the generated induced current is transmitted to the analog/digital converter $ADC_1$. After the conversion of the analog/digital converter $ADC_1$, the current detecting signal $S_{I2}$ is generated and transmitted to the chipset CS.

Figure 4:
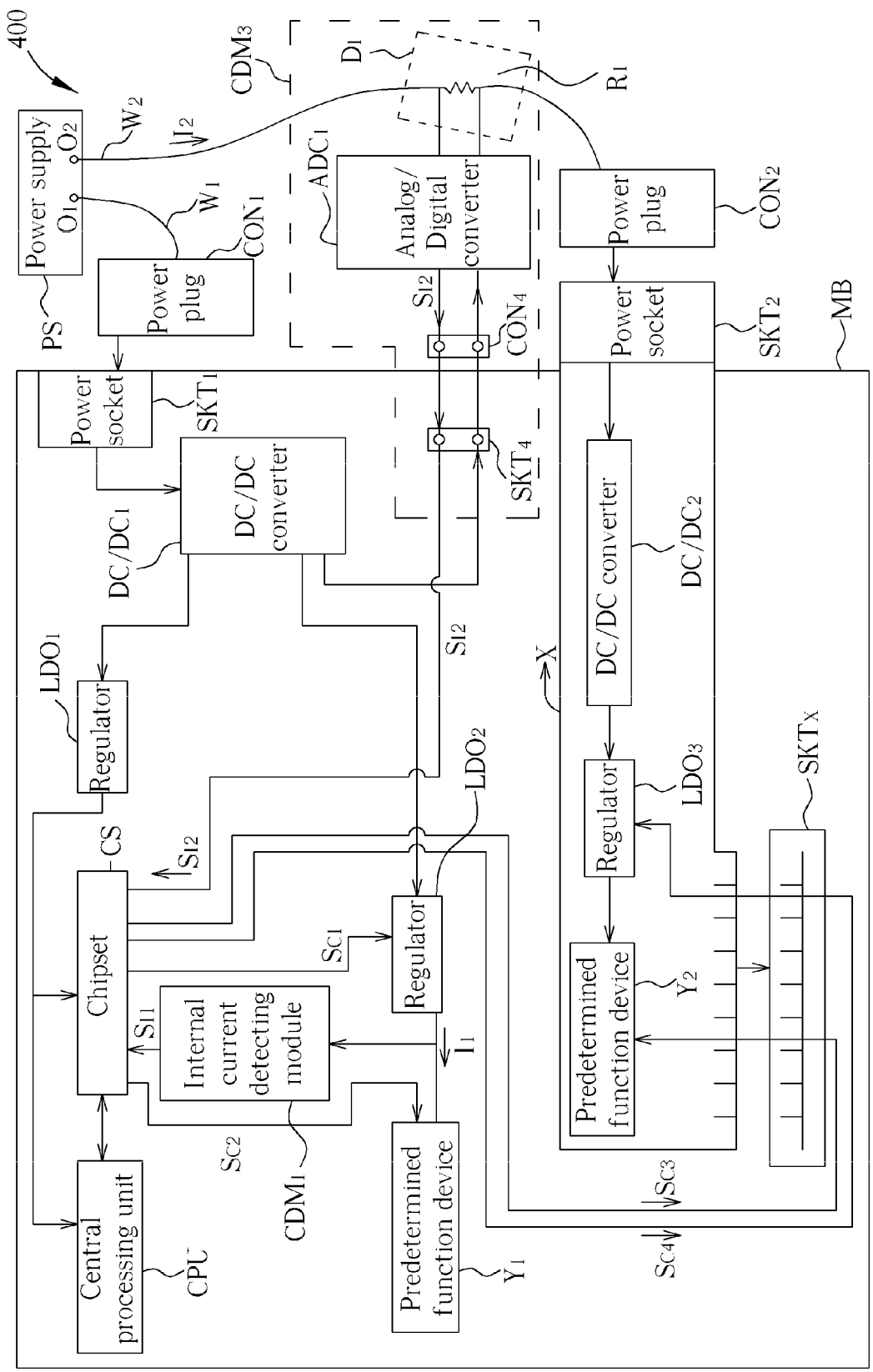
FIG. 4 is a computer utilizing a power management system according to a third embodiment of the present invention.

Please refer to FIG. 4. FIG. 4 is a computer 400 utilizing a power management system according to a third embodiment of the present invention. As shown in FIG. 4, the computer 400 comprises a power supply PS, a mother board MB, and an additional current detecting module $CDM_3$. The mother board MB comprises a central processing unit CPU, a chipset CS, two regulators $LDO_1$, and $LDO_2$, a predetermined function device $Y_1$, and an internal current detecting module $CDM_1$. The power management system 410 (not shown) comprises the chipset CS and the additional current detecting module $CDM_3$. FIG. 4 is similar to FIG. 2 and the related description is omitted. The difference between FIG. 4 and FIG. 2 is that the additional current detecting module $CDM_3$ of the power management system 410 is disposed outside of the mother board MB. As shown in FIG. 4, the analog/digital converter $ADC_1$ of the current detecting module $CDM_3$ is disposed outside of the mother board MB. Consequently, the required power and the current detecting signal of the additional current detecting module $CDM_3$ have to be transmitted through the plug $CON_4$ and the socket $SKT_4$. The required power of the analog/digital converter $ADC_1$ can be transmitted to the analog/digital converter $ADC_1$ from the DC/DC converter $DC/DC_1$ of the mother board MB, through the socket $SKT_4$ and the plug $CON_4$. The current detecting signal $S_{I2}$ generated from the analog/digital converter $ADC_1$ is also transmitted to the chipset CS through the plug $CON_4$ and the socket $SKT_4$.

Additionally, in FIG. 4, the current detector $D_1$ is realized with a resistor $R_1$. The resistor $R_1$ and the power cord $W_2$ are connected in series. In this way, the current passing through the power cord $W_2$ can be determined according to the voltage drop on the resistor $R_1$. Therefore, after the conversion of the analog/digital converter $ADC_1$, the current detecting signal $S_{I2}$ is transmitted to the chipset CS.

Therefore, the computer 400 not only detects the power consumption of the devices on the mother board but also detects the power consumption of the external device X by utilizing the power management system 410 of the present invention. In this way, the total power consumption of the computer 400 can be accurately calculated and the operation statuses of the internal devices of the computer 400 and the external device X can be controlled efficiently.

Figure 5:
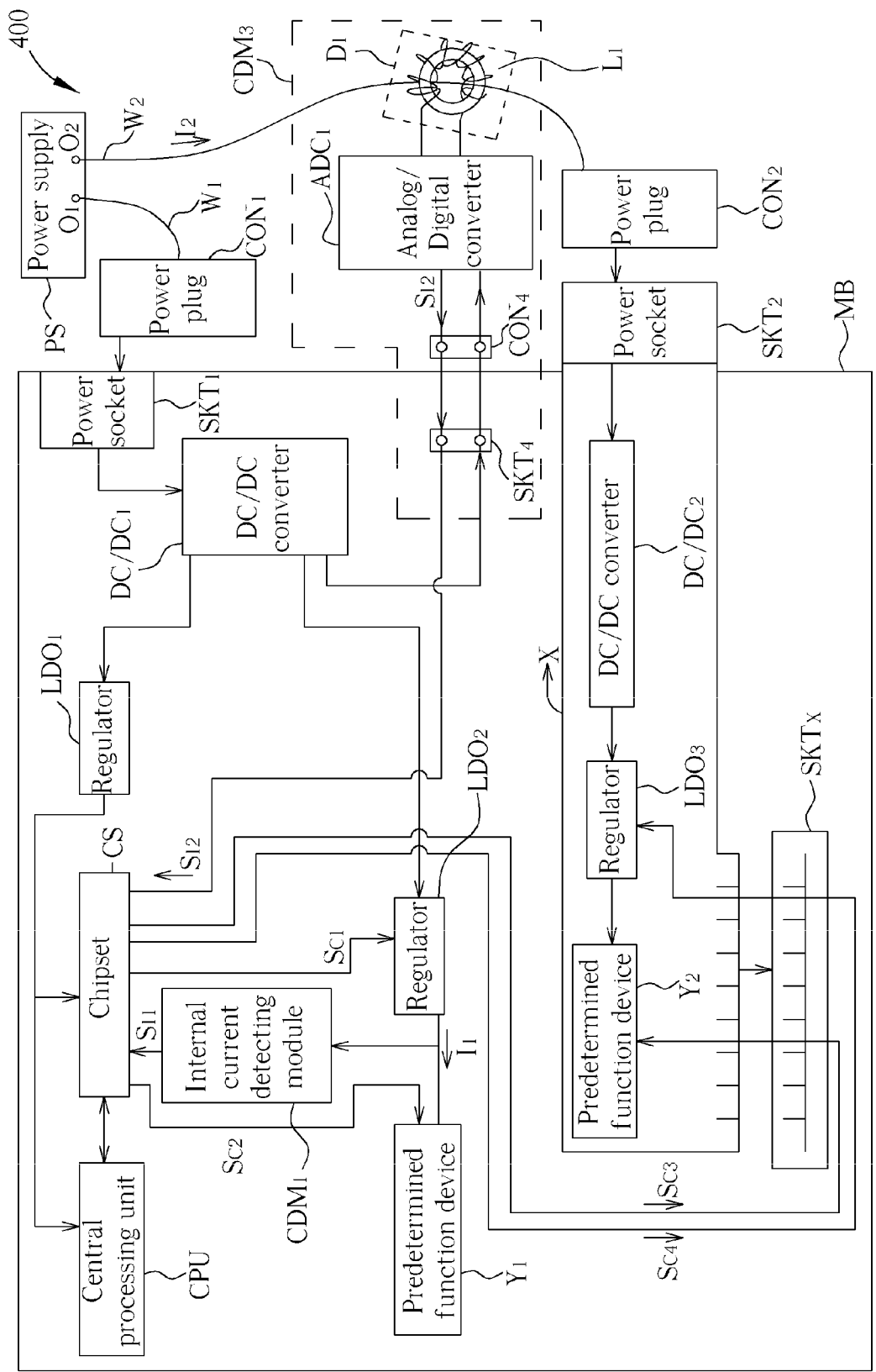
FIG. 5 is a computer utilizing a power management system according to a fourth embodiment of the present invention.

Please refer to FIG. 5. FIG. 5 is a computer 400 utilizing a power management system according to a fourth embodiment of the present invention. As shown in FIG. 5, the computer 400 comprises a power supply PS, a mother board MB, and an additional current detecting module $CDM_3$. The mother board MB comprises a central processing unit CPU, a chipset CS, two regulators $LDO_1$, and $LDO_2$, a predetermined function device $Y_1$, and an internal current detecting module $CDM_1$. The power management system 510 (not shown) comprises the chipset CS and the additional current detecting module $CDM_3$. FIG. 5 is similar to FIG. 4 and the related description is omitted. The power management system 510 is similar to the power management system 410 and the related description is omitted. The difference between the power management systems 510 and 410 is that in the additional current detecting module $CDM_3$ of the power management system 510, the current detector $D_1$ is realized with an inductor $L_1$. The inductor $L_1$ can be a ring-shaped inductor surrounding the power cord $W_2$. The inductor $L_1$ generates induced current according to the current passing through the power cord $W_2$, and the generated induced current is transmitted to the analog/digital converter $ADC_1$. After the conversion of the analog/digital converter $ADC_1$, the current detecting signal $S_{I2}$ is generated and transmitted to the chipset CS.

Figure 6:
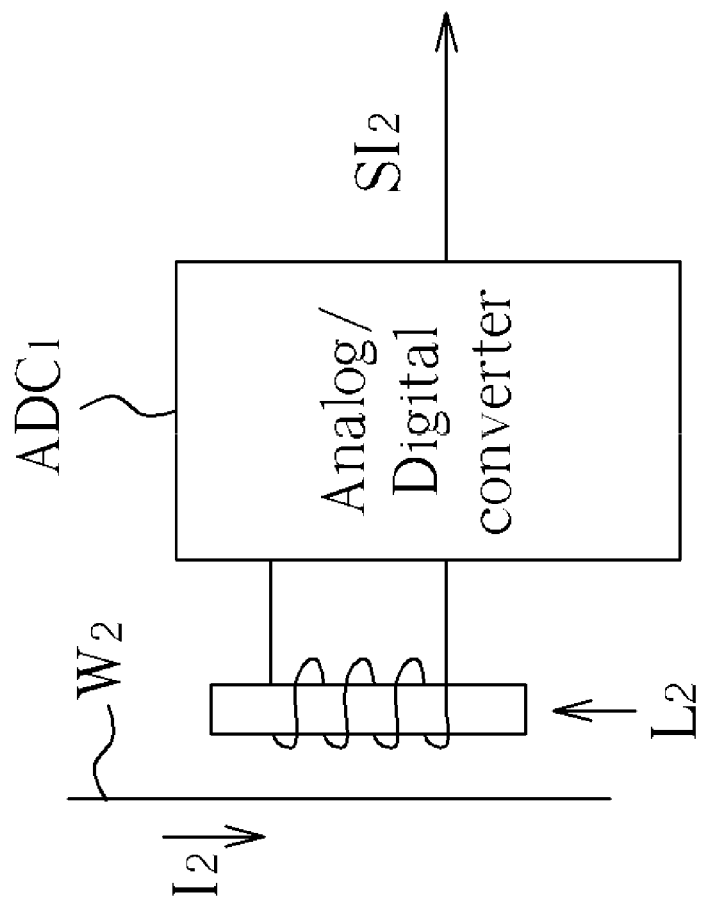
FIG. 6 is a diagram illustrating another embodiment of the current detector of the present invention.

Please refer to FIG. 6. FIG. 6 is a diagram illustrating another embodiment of the current detector of the present invention. As shown in FIG. 6, the current detector $D_1$ can be realized with a pole-shaped inductor $L_2$. The pole-shaped inductor $L_2$ generates induced current according to the current passing through the power cord $W_2$ coupled to the second output end $O_2$ of the power supply PS, and the generated induced current is transmitted to the analog/digital converter $ADC_1$. After the conversion of the analog/digital converter $ADC_1$, the current detecting signal $S_{I2}$ is generated and transmitted to the chipset CS. It is noticeable that the distance between the pole-shaped inductor $L_2$ and the power cord $W_2$ coupled to the second output end $O_2$ of the power supply PS needs to be appropriately designed for avoiding unacceptable errors on the current detecting signal $S_{I2}$ generated from the analog/digital converter $ADC_1$.

To sum up, the computer not only detects the power consumption of the devices on the mother board but also detects the power consumption of external devices by utilizing the power management system provided by the present invention. In this way, the total power consumption of the computer can be accurately calculated and the operation statuses of the internal devices of the computer and the external devices can be controlled efficiently, providing great convenience.

Those skilled in the art will readily observe that numerous modifications and alterations of the device and method may be made while retaining the teachings of the invention.

What is claimed is:

1. A computer having power management function, comprising:
    a power supply, comprising a first power plug and a second power plug for respectively providing power;
    an external device with a second socket, wherein the second socket is coupled to the second power plug for receiving power; and
    a mother board with a first socket, wherein the first socket is coupled to the first power plug for receiving power, the mother board comprising:
        a current detecting module, coupled between the second power plug and the power supply for detecting current in a power line disposed between the second power plug and the power supply and accordingly outputting a current detecting signal; and
        a controller, coupled between the current detecting module and the external device, for outputting a control signal to the external device according to the current detecting signal so as to control operating frequency or the operating voltage of the external device;
        wherein when the current detecting signal is lower than a predetermined value, controller outputs the control signal to the external device for decreasing the operating frequency or the operating voltage of the external device, and when the current detecting signal is higher than the predetermined value, controller outputs the control signal to the external device for increasing the operating frequency or the operating voltage of the external device.

2. The computer of claim 1, wherein the additional current detecting module comprises:
    a current detector, coupled between the second output end of the power supply and the external device, for detecting the current received by the external device and accordingly outputting an analog current detecting signal; and
    an analog/digital converter, coupled to the current detector, for converting the analog current detecting signal to a digital signal as the current detecting signal.

3. The computer of claim 2, wherein the current detector is an inductor or a resistor.

4. The computer of claim 1, wherein the controller is a chipset.

5. A computer having power management function, comprising:
    a power supply, comprising a first power plug and a second power plug for respectively providing power;
    an external device with a second socket, wherein the second socket is coupled to the second power for receiving power;
    a current detecting module, coupled between the second power plug and the power supply for detecting current in a power line disposed between the second power plug and the power supply and accordingly outputting a current detecting signal; and
    a mother board with a first socket, wherein the first socket is coupled to the first power plug for receiving power, the mother board comprising:
        a controller, coupled between the current detecting module and the external device, for outputting a control signal to the external device according to the current detecting signal so as to control operating frequency or the operating voltage of the external device
        wherein when the current detecting signal is lower than a predetermined value, controller outputs the control signal to the external device for decreasing the operating frequency or the operating voltage of the external device, and when the current detecting signal is higher than the predetermined value, controller outputs the control signal to the external device for increasing the operating frequency or the operating voltage of the external device.

6. The computer of claim 5, wherein the additional current detecting module comprises:
    a current detector, coupled between the second output end of the power supply and the external device, for detecting the current received by the external device and accordingly outputting an analog current detecting signal; and
    an analog/digital converter, coupled to the current detector, for converting the analog current detecting signal to a digital signal as the current detecting signal.

7. The computer of claim 6, wherein the current detector is an inductor or a resistor.

8. The computer of claim 5, wherein the controller is a chipset.

* * * * *